W. S. BALL.
LOCK.
APPLICATION FILED APR. 29, 1913.

1,103,897.

Patented July 14, 1914.
3 SHEETS—SHEET 1.

WITNESSES:
Charles Pickles
R. S. Berry

INVENTOR
Waldon S. Ball.
BY G. H. Strong.
ATTORNEY

W. S. BALL.
LOCK.
APPLICATION FILED APR. 29, 1913.
1,103,897.
Patented July 14, 1914.
3 SHEETS—SHEET 2.
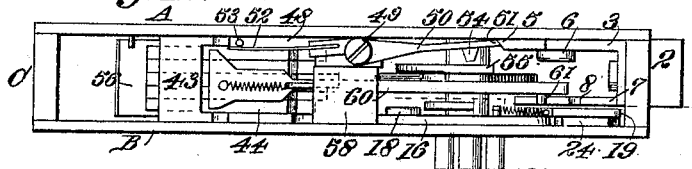
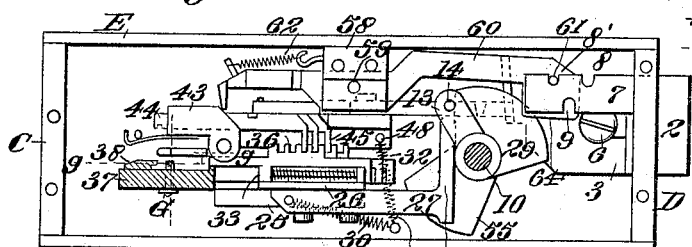
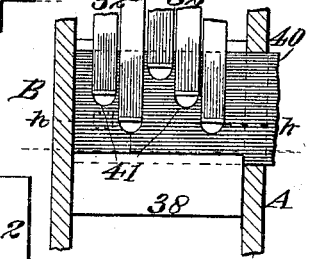
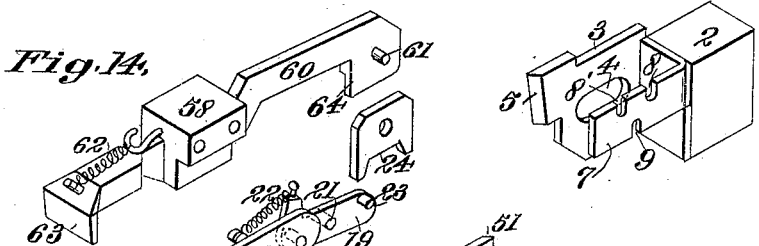
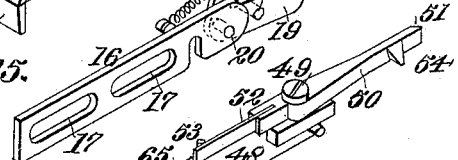
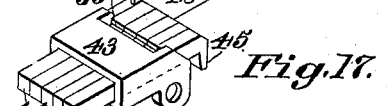
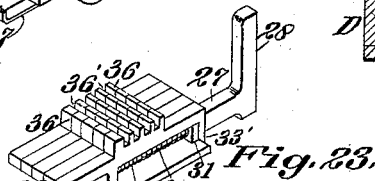
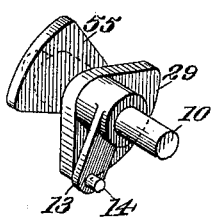
WITNESSES:
Charles Pickles
R. S. Berry
INVENTOR
Waldon S. Ball
BY G. H. Strong
ATTORNEY

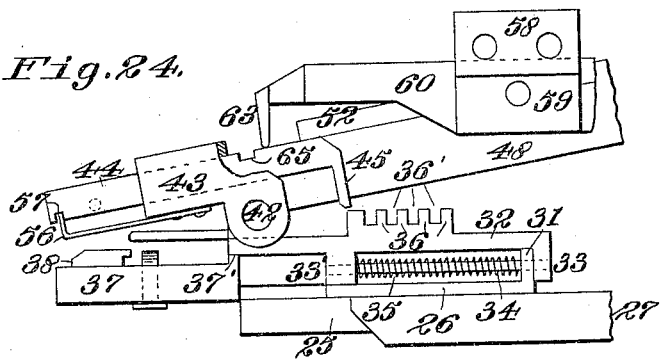
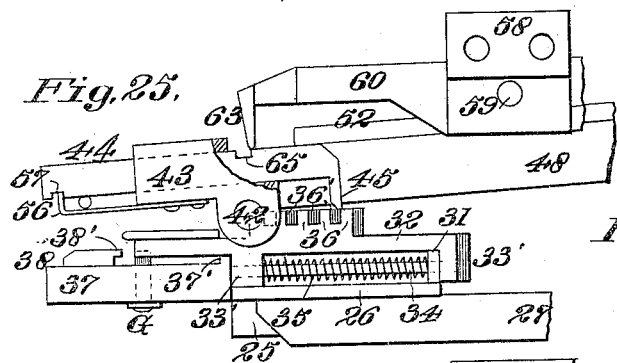
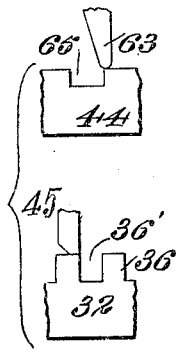
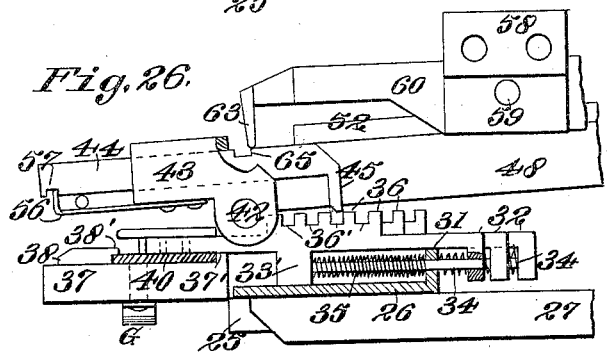
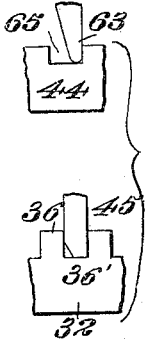
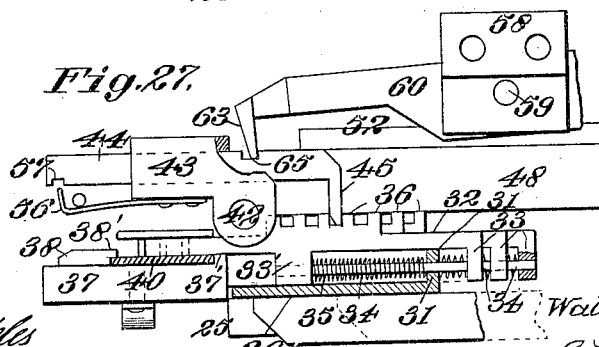

UNITED STATES PATENT OFFICE.

WALDON S. BALL, OF SAN FRANCISCO, CALIFORNIA.

LOCK.

1,103,897.   Specification of Letters Patent.   Patented July 14, 1914.

Application filed April 29, 1913. Serial No. 764,355.

*To all whom it may concern:*

Be it known that I, WALDON S. BALL, a citizen of the United States, residing in the city and county of San Francisco and State of California, have invented new and useful Improvements in Locks, of which the following is a specification.

This invention relates to a lock, and particularly pertains to a permutation lock of the interchangeable key type.

It is the object of this invention to provide a lock which is so constructed that it may be locked by a large number of different keys, and unlocked only by the key employed in locking it.

A further object is to provide a lock of the above character which is especially adapted to be operated by a thin wafer-like key so that the keyhole of the lock will be extremely narrow, thus rendering it difficult to insert lock-picking instruments therein.

A further object is to provide a lock which is especially adapted for use on safety-deposit boxes, lockers, and like structures provided for public use, which will not necessitate change or alteration in the construction of the lock when the deposit boxes or lockers change hands, and in which the key may be destroyed after being once used and a different key substituted therefor, so as to prevent the lock being operated by duplicate keys made by unauthorized persons.

Other objects will appear hereinafter.

The invention primarily resides in a dead bolt, a tumbler for locking the bolt in either its advanced or retracted position, key-controlled means for controlling the operation of the tumbler, manually operated means adapted to actuate the tumbler and advance or retract the lock bolt independent of the key, and a selective mechanism operable by said manually-operated means coöperating with a key to permit the operation of the tumbler and lock bolt on the insertion of any one of a number of different keys in the lock, and so constructed as to prevent the unlocking of the lock only on the insertion of the key employed in locking the lock.

The invention further consists of the parts and the construction and combination of parts as hereinafter more fully described and claimed, having reference to the accompanying drawings, in which—

Figure 1:
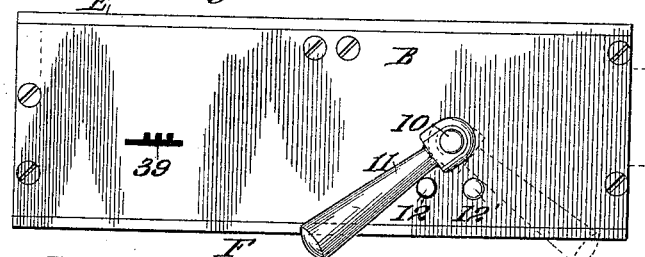
Figure 6:
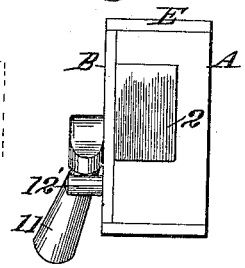
Figure 2:
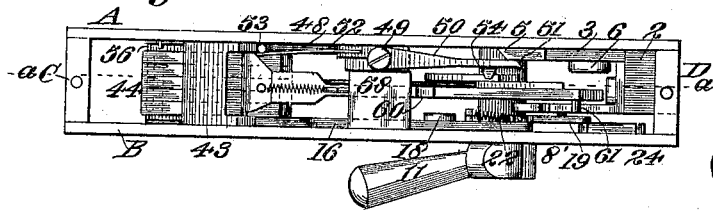
Figure 7:
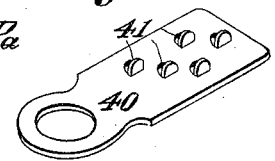
Figure 3:
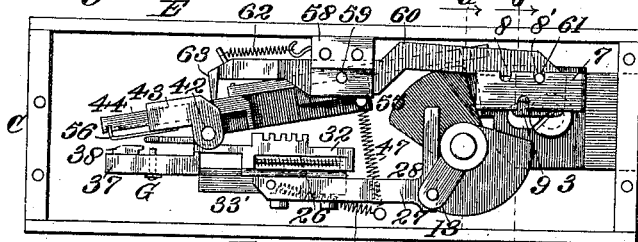
Figure 8:
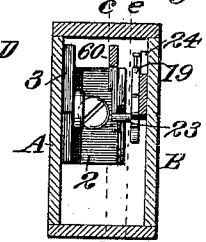
Figure 4:
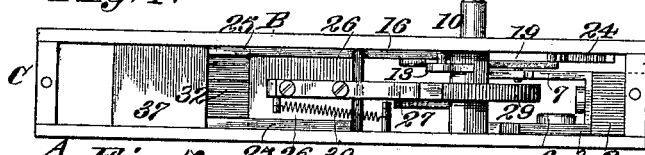
Figure 9:
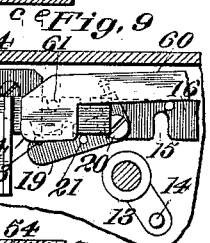
Figure 5:
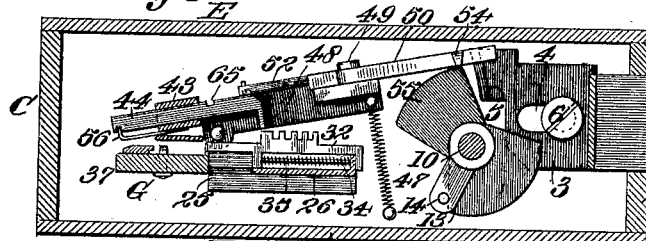
Figure 10:
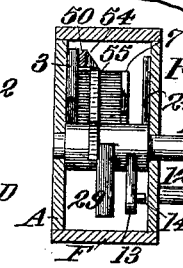
Figure 11:
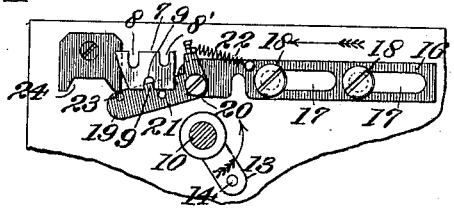

Figure 1 is a side elevation of the lock in the unlocked position. Fig. 2 is a plan view with the top plate removed. Fig. 3 is a side elevation with the face plate removed. Fig. 4 is an inverted plan view with the bottom plate removed. Fig. 5 is a longitudinal section on the line *a*—*a* of Fig. 2. Fig. 6 is an end view. Fig. 7 is a detail in perspective of a key employed in the operation of the lock. Fig. 8 is a vertical transverse section on the line *b*—*b* of Fig. 3. Fig. 9 is a detail section on the line *c*—*c* of Fig. 8. Fig. 10 is a vertical transverse section on the line *d*—*d* of Fig. 3, partly in elevation. Fig. 11 is a detail section and elevation on the line *e*—*e* of Fig. 8. Fig. 12 is a plan view with the top plate removed, showing the lock in its locked position. Fig. 13 is a front elevation with the face plate removed, corresponding to Fig. 12. Fig. 14 is a detail in perspective of the lock tumbler. Fig. 15 is a perspective view of the bolt-operating plate. Fig. 16 is a perspective view of the tumbler locking bars and their pivotal guide housing. Fig. 17 is a perspective view of the tumbler controlling bars and their carriage. Fig. 18 is a perspective view of the rock shaft and the operating members thereon. Fig. 19 is a perspective view of the lock bolt. Fig. 20 is a detail section and elevation on the line *f*—*f* of Fig. 12. Fig. 21 is an enlarged detail in plan on the line *g*—*g* of Fig. 13, showing the key in the lock and illustrating the manner in which the key controls the operation of the lock. Fig. 22 is a section on the line *h*—*h* of Fig. 21. Fig. 23 is a detail in plan, showing the selector bars as engaged by the locking bars. Fig. 24 is a detail in elevation with parts broken away of the key-controlled mechanism with the parts disposed in the positions assumed prior to the operation of the lock. Fig. 25 is a similar view, showing the parts as positioned on the initial operation of the hand-lever when a key is not inserted in the lock. Fig. 26 is a detail view in elevation with parts broken away of the key-controlled mechanism in the position assumed when the key is inserted in the lock and on the initial operation of the hand-lever. Fig. 27 is a similar view, showing the parts in the positions assumed when the selector bars are engaged by the tumbler controlling bars and the tumbler is released to permit reciprocation of the lock bolt. Fig. 28 is a detail illustrating the relative positions of the selector bar, tumbler controlling bar, and tumbler when the operation of the latter is prevented. Fig. 29 is a similar view, showing the parts in their relative positions on the release of the tumbler.

In the drawings the lock casing is shown as rectangular in form and consists of a pair of face plates A and B, mounted on end plates C and D, and top and bottom plates E and F attached to the end plates C and D. Reciprocally mounted in the end plate D is a dead bolt 2, which is constructed as shown in Fig. 19, and is adapted to be retracted so that its outer end will lie substantially flush with the outer face of the end plate D, as shown in Fig. 5; and to be advanced into the position shown in Figs. 12 and 13, and in dotted lines in Fig. 1, to engage a keeper of any suitable description, not shown. The manner of advancing and retracting the bolt 2 will be later described.

Secured to the bolt 2, or integral therewith, is a plate 3, formed with a horizontally extending slot 4, having its outer vertical edge beveled, as indicated at 5. The plate 3 is disposed with its outer face in slidable contact with the inner face of the plate A, in which position it is retained by means of a guide screw 6, which passes through the slot 4 and is threaded into the face plate A, as shown in Fig. 5; the screw 6 acting in conjunction with the bolt opening in the end plate D to guide the bolt 2 on its reciprocal movement.

Paralleling the plate 3 and rigidly mounted on the bolt 2, or integral therewith, is a bracket 7, which is formed with a pair of spaced vertical notches 8 and 8' on its upper edge, and a single notch 9 on its underside, which is disposed mediate the notches 8 and 8'. The bracket 7 extends inwardly parallel with the face plate B and is spaced a short distance therefrom.

Journaled in the face plates A and B is a rock shaft 10, which is disposed immediately back of the bolt 2 and slightly below the bracket 7, as particularly shown in Fig. 3. Mounted on the rock shaft 10, exterior of the lock casing and adjacent the face plate B, is a hand-lever 11, which is adapted to be operated manually to actuate the rock shaft and rotate the latter approximately two-thirds of a revolution, more or less; the hand-lever 11 normally depending downward in the position shown in full lines in Fig. 1 and abutting against a stop pin 12 on the face plate B. A stop pin 12' is mounted on the face plate B, and is so positioned as to form an abutment for the hand-lever 11, to limit the movement of the latter, as indicated in dotted lines in Fig. 1.

Mounted on the shaft 10 adjacent to the inner side of the face plate B is a crank 13 having a longitudinally extending pin 14 on its outer end, which pin is positioned to engage a notch 15 formed in the lower edge of a horizontally disposed reciprocal plate 16, slidably mounted on the inner side of the face plate B, as particularly shown in Fig. 11; the plate 16 being provided with horizontal slots 17 through which guide screws 18 extend and are threaded in the face plate B. The screws 18 form a bearing or support for the plate 16. The crank 13 normally extends downward approximately parallel with the hand-lever 11, as shown in Fig. 9, in which position it is clear of the plate 16, so that the rock shaft 10 may be rotated approximately half of its movement before the pin 14 will engage the notch 15. The plate 16 is dead; that is to say depends upon no springs for its reciprocation in either direction, its movement being occasioned only by the action of the crank 13 and pin 14, which on the operation of the hand-lever 11 acts to advance the plate 16 from the position shown in Fig. 9 into the position shown in Fig. 20, or vice versa; the pin 14 moving in and out of engagement with the notch 15 when the plate 16 reaches the limit of its movement in either direction, which movement equals the cord of the arc traversed by the pin 14 during its engagement with the plate.

Mounted on the outer end of the plate 16 is a bolt-operating dog 19, in the form of a bent lever which is pivoted at 20 to the plate 16, with its long arm extending downwardly at a slight angle to the horizontal adjacent the outer face of the bracket 7. Mounted on the dog 19 is a pin 21, which extends inwardly beneath the lower edge of the bracket 7 and is adapted to ride in and out of the notch 9, as will be later described; a helical spring 22, having one end attached to the plate 16 and the other to the short arm of the dog, operating to exert an upward pull on the long arm of the dog to normally cause the pin 21 to bear upward against the underside of the bracket 7.

Mounted on the outer end of the dog 19 is an inwardly extending pin 23, which is positioned to be operated in opposition to the spring 22 by a fixed cam 24 on the face plate B, to move the pin 21 out of engagement with the notch 9 on the forward and retracted movement of the bolt 2, as will be later described.

Mounted in horizontal guides 25 on the inner sides of the face plates A and B is a carriage 26, which is disposed rearward of the shaft 10 and spaced some distance therefrom. Attached to the carriage 26 is a bar 27 which extends toward the rock shaft 10 and is turned upwardly at its outer end to form a bearing shoe 28 which normally contacts a cam 29 mounted on the rock shaft 10; a helical spring 30 having one end attached to the carriage 26 and the other end connected to the face plate A acting to normally retain the carriage 26 in its forwardmost position, with the shoe 28 bearing against the cam 29. Formed on the carriage 26 is an upwardly extending flange 31, and supported on the upper face of the carriage is a series of selector bars 32, in this case five in number, which bars extend parallel with the face plates A and B and have spaced downwardly projecting flanges 33 and 33' on their undersides.

Carried by the flanges 33 and 33' on each of the selector bars 32 is a pin 34, which is supported at its ends in the flanges 33 and 33' and passes through a perforation in the flange 31, thus slidably connecting the selector bars 32 to the carriage 26. A helical spring 35 is wound on each pin 34 and bears between the flange 31 on the carriage 26 and the rearward flange 33' on a selector bar 32; the springs 35 acting to normally retain the selector bars in their rearwardmost position in relation to the carriage 26 and with the forward flanges 33 abutting against the front face of the flange 31, to limit the rearward movement of the selector bars 32 in relation to the carriage 26.

Formed on the upper face of each selector bar 32 is a series of rectangular teeth 36, in this case five in number, the teeth on the adjacent selector bars being arranged in alinement with each other so as to form parallel continuous channels or grooves 36' across the upper surface of the series of selector bars, as particularly shown in Fig. 17. The selector bars 32 are of equal lengths, and are arranged in horizontal alinement with each other, with their upper faces disposed on the same plane.

Mounted on the plate A, rearward of the guides 25, is a plate 37, which extends transversely across the lock casing, with its outer end terminating adjacent the inner face of the plate B. The upper face of the plate 37 is positioned slightly below the lower faces of the selector bars 32. A flange 37' on one edge of the plate 37 extends upward and slidably contacts the underside of the selector bars 32 adjacent to their outer ends which normally project some distance rearward of the carriage 26.

Mounted on the plate 37, or formed integral therewith, is a guide plate 38, formed with an overhanging flange 38' on its inner face, the underside of which flange is approximately on a plane with the upper face of the flange 37'. Formed on the face plate B is a horizontally extending key slot 39 which is disposed with its lower edge in alinement with the upper face of the plate 37 and its upper edge in alinement with the underside of the flange 38' and the top of the flange 37'. The key slot 39 is designed to receive a key 40, particularly shown in Fig. 7, which key is in the form of a thin sheet of metal or other suitable material, having a series of projections 41 extending upwardly from its upper face; the key slot 39 having vertical notches in its upper edge to accommodate the stops 41 and permit the insertion and removal of the key 40. The projections 41 on the key 40 are designed and arranged to be disposed in alinement with the rear ends of the selector bars 32 when the key is inserted in the lock, as particularly shown in Fig. 21; the projections 41 forming stops to limit the rearward movement of the selector bars 32 when the key is in the lock and the carriage 26 is moved to its rearmost position, as will be later described.

Slidably mounted in the plate 37 is a vertically disposed pin G, which is supported on a plate spring on the underside of the plate 37 and is normally positioned with its upper end projecting a short distance above the upper face of the plate 37 in alinement with one of the selector bars 32, and in the path of travel thereof. The pin G is so positioned that when the carriage 26 is moved to its rearmost position it will operate to obstruct the movement of one of the selector bars 32 so as to position the teeth 36 thereon in alinement with the notches 36' on the adjacent selector bars. The upper end of the pin G normally extends in the path of the key 40 and is beveled on the side toward the key-slot 39, so that when a key 40 is inserted in the lock the end of the key will pass over and act on the beveled end of the pin G in such manner as to move the latter downwardly in opposition to the spring H out of the path of travel of the selector bars 32. The pin G is preferably rectangular in cross section and rides in a correspondingly shaped perforation in the plate 27, so that the pin G will not turn in its mounting; but any other construction to accomplish this purpose may be provided.

Pivotally mounted on the face plates A and B at 42, is a rectangular guide housing 43, which is disposed above the plate 37 and forms a bearing for a series of bars 44 which are loosely mounted in the housing 43 and are adapted to be reciprocated therein; the bars 44 being provided for the purpose of controlling the operation of the lock tumbler, as will be later described. Formed on the forward ends of the bars 44 are downwardly extending projections or fingers 45, the front and rear lower edges of which are beveled, as at 46. The housing 43 is designed to be rocked vertically on its pivotal mounting 42, to carry the bars 44 therewith and move the fingers 45 in and out of the grooves 36' and in and out of engagement with the teeth 36 on the selector bars 32 when the carriage 26 is in its rearmost position and the teeth 36 on the bars 32 are alined; the downward movement of the bars being effected by means of a helical spring 47 having one end attached to the face plate A, and its other end connected to an extension 48 formed on the housing 43 and extending parallel with the face plate A. Pivotally mounted at 49 on the extension 48, to swing in a horizontal direction, is an arm 50, the outer end of which extends forwardly over the rock shaft 10 in such position as to be in the path of travel of the plate 3 on the bolt 2; the vertical outer end of the arm 50 being beveled at 51 so that it may be readily engaged by the beveled portion 5 of the plate 3 on the rearward movement of the bolt 2 to rock the arm 50 to its outermost position. Mounted on the arm 50 is a plate spring 52 which bears against the pin 53 on the projection 48 and operates to normally retain the outer end of the arm 50 against the inner face of the face plate A or the plate 3 on the bolt 2.

Formed on the inner face of the arm 50 adjacent its outer end is a projection 54, which is arranged to be engaged by a cam 55 mounted on the rock shaft 10. The cam 55 is so shaped that when the parts are in their normal position, as shown in Fig. 5, the projection 54 on the arm 50 will be engaged thereby in such manner as to retain the forward portion of the guide housing 43 in its uppermost position in opposition to the spring 47 and thereby dispose the fingers 45 on the bars 44 out of engagement with the teeth 36 of the selector bars 32; the cam 55 being shaped to move from under the projection 54 on the arm 50 on the rotation of the shaft 10, to allow the spring 47 to actuate the pivoted guide housing 43 and move the outer ends of the bars 45 downwardly into the grooves 36', as will be later described.

Mounted on the underside of the rear portion of the pivoted guide housing 43 is a plate spring 56, which has an upturned outer end adapted to extend into notches 57 formed on the undersides of the bars 44 adjacent to their rear ends; the spring 56 normally engaging the bars 44 to prevent longitudinal movement of the latter when the rear portion of the guide housing 43 is rocked to its lowermost position; in which position the notches 57 on adjacent bars will be in alinement.

Mounted on the face plate B, adjacent to the top plate E, is a bracket 58, and pivotally mounted at 59 thereon is a lever or tumbler 60. The tumbler 60 normally extends in a substantially horizontal direction with its forward end terminating alongside of the inner face of the notched bracket 9 on the bolt 2, and with its rear end extending over the forward ends of the bars 44. Mounted on the forward end of the tumbler 60 is a pin 61, which is designed to engage the notch 8 when the bolt 2 is in its retracted position, and to engage the notch 8' when the bolt is in its advanced position, to lock the bolt against movement in either direction. A helical spring 62, having one end attached to the bracket 58, connects with the rear end portion of the tumbler 60 and operates to normally retain the forward end of the tumbler in its lowermost position and yieldably hold the pin 61 in engagement with either of the notches 8 or 8'. Formed on the rearward end of the tumbler 60 is a downwardly extending portion or heel 63, which normally rests on the upper faces of the bars 44, immediately forward of a series of alined notches 65, formed in the upper faces of said locking bars. The forward end of the tumbler 60 has a downwardly extending portion or toe 64 which terminates a short distance below the lower edge of the bracket 9 and extends in the path of travel of the pin 21 on the dog 19 when the plate 16 is reciprocated, in such manner that the pin 21 will operate to rock the tumbler 60 when the alined notches 65 on the bars 44 have been positioned directly under the heel 63 on the tumbler 60, as will be hereinafter set forth. When the notches 65 on the bars 44 are disposed out of alinement with each other, or out of alinement with the heel 63 on the tumbler 60, the latter will be prevented from being rocked by the pin 21 to move the pin 61 out of either of the notches 8 or 8'; and when the tumbler 60 is thus held against rocking movement, the pin 21 will be prevented from entering the notch 9 on the bracket 7, so that the rock shaft may be operated in either direction without affecting the bolt 2. This is the case when the bolt 2 is in either its advanced or retracted position.

It will be seen that by positioning the notches 65 in the bars 44 in alinement with each other, and disposing them in such relation to the heel 63 on the tumbler 60, that the heel 63 will be free to enter the notches 65, that the tumbler 60 will be rocked by the engagement of the pin 21 with the underside of the toe 64 in such manner as to cause the pin 61 to move out of engagement with either the notch 8 or 8' and permit the pin 21 to engage the notch 9 and thereby allow the bolt 2 to be advanced, or retracted by the operation of the rock shaft 10.

The function of the key 40 is to depress the pin G and obstruct the movement of the selector bars 32 on the rearward movement of the carriage 26, and to dispose the selector bars 32 in such position that the notches 36' between the teeth 36 thereon will be arranged in alinement with the lower ends of the fingers 45 on the bars 44, as shown in Figs. 26 and 28, so that the spring 47 in operating to rock the housing 43 will move the outer end of the bars 44 downward and cause the fingers 45 to move into the spaces 36' between the teeth 36, as shown in Figs. 27 and 29, and thereby dispose the channel formed by the notches 65 immediately under the heel 63 on the tumbler 60, to permit the tumbler being operated. The tumbler is prevented from being operated when a key is not in the lock by reason of the pin G acting to dispose one of the selector bars 32, when the carriage 26 is moved rearwardly, so that one of the teeth 36 on the bar 32 will be positioned beneath a finger 45 on one of the bars 44, as shown in Fig. 28, and thereby prevent the outer ends of the bars 44 moving to their lowermost position. The notches 64 on the bars 44 being so arranged that the shoe 63 will not enter therein, unless the outer ends of the bars 44 are in their lowermost position, prevents the operation of the tumbler when the downward movement of the outer ends of the bars 44 is inhibited by a tooth 36, as just described. This arrangement is effected by reason of the notches 65 being caused to travel on an arc of a circle on the rocking of the housing 43 and by reason of the shoe 63 being so disposed that the notches 65 will advance and recede in relation thereto, and will not come into alinement with the shoe only when the bars 44 reach the limit of their downward travel.

In the operation of the lock three separate conditions are to be considered as follows: First,—the movements that take place on the manipulation of the hand-lever 11 when the lock is in its unlocked position and no key therein. Second,—the operation that occurs when a key is inserted in the lock and the hand-lever operated to either advance or retract the lock bolt, and third,—the movements occasioned by the manipulation of the hand-lever when the bolt is advanced and after the key has been withdrawn from the lock. These several conditions are due to the construction being such that the hand-lever 11 is free to be operated with or without the key in the lock, and by which the operation of the hand-lever will act to advance the lock bolt only when a key is inserted in the lock, and to retract the bolt only when the same key employed in permitting the operation of the lock bolt has been reinserted in the lock.

The operation in the first instance above recited is as follows: Assume the parts to be in their normal position, as shown in Figs. 1 to 5, inclusive, with no key in the lock and the hand-lever disposed in the normal position shown in full lines in Fig. 1. On moving the hand-lever 11 upward to rotate the rock shaft 10, the first action that occurs is the rearward reciprocation of the carriage 26 by the action of the cam 29; the cam 29 immediately operating on the initial movement of the rock shaft 10 to move the carriage 26 rearwardly, through the medium of the bar 27 and shoe 28 in opposition to the spring 30; the carriage 26 carrying the selector bars 32 rearward therewith. The cam 29 is so shaped as to move the carriage 26, and the selector bars 32 thereon, from the position shown in Fig. 24 to the position shown in Fig. 25; this movement of the carriage taking place on approximately one-third or less of the movement allowed the rock shaft 10. When the carriage 26 is in its rearmost position, as shown in Fig. 25, the forward row of grooves or notches 36' on the series of selector bars 32 will be disposed immediately in the path of travel of the fingers 45 on the bars 44; the fingers 45 being then positioned immediately above the grooves, rearward of the forward row of teeth 36. One of the selector bars 32, however, will be prevented from moving to its rearmost position by the stop-pin G, so that one of the teeth 36 thereon will be disposed beneath the fingers 45 on one of the bars 44. The fingers 45 on the bars 44, being normally retained out of engagement with the teeth 36 on the selector bars 32 by the action of the cam 55, permits of the rearward movement of the selector bars 32 with the carriage 26, as just described; all selector bars 32, except the one stopped by the pin G, being allowed to move collectively to their rearmost position when there is no key in the lock. Immediately before the selector bars 32 and carriage 26 reach their rearmost positions, the cam 55 moves away from the projection 54 on the arm 50 and allows the spring 47 to move the extension 48 on the guide housing 43 in a downward direction and thereby rocks the housing 43 and causes the fingers 45 on the bars 44 to move from their normal position shown in Fig. 24 downward toward the space 36' between the end rows of teeth 36 on the selector bars 32, as shown in Fig. 25. The bars 44 in moving upward at their rear ends are moved away from the spring 56 so as to disengage the latter from the notches 57 on the bars 44; the outer end of the spring 56 being held against upward movement with the housing 43 by pins 56' on the face plates A and B and engaging the outer end of the spring. The channel formed by the notches 65 on the upper edge of the bars 44 will now be positioned adjacent the heel 63 on the tumbler 60 and in such close proximity thereto that the lower edge of the heel 63 will rest on the forward edge of the notches 65, as shown in Figs. 25 and 28. When the parts are thus positioned, the crank 13 will be so disposed that the pin 14 thereon will engage with the notch 15 on the reciprocal plate 16, so that a continued forward movement of the hand-lever 11 will cause the pin 14 to advance the plate 16; this advanced movement of the plate 16 taking place on approximately another one-third of the movement of the rock shaft 10. During this second step or movement of the rock shaft 10 the cam 29 will act to retain the carriage 26 and the selector bars 32 in their rearmost position, as previously described. The advanced movement of the plate 16 causes the pin 21 on the dog 19 to ride under and bear upward against the lower edge of the toe 64 on the tumbler 60 therewith, to rock the latter on its pivot 59. Movement of the tumbler 60, however, is prevented by reason of the shoe 63 thereon abutting against the upper faces of the bars 44 adjacent the forward edges of the notches 65. The toe 64 now operates to depress the dog 19 in opposition to the spring 22 and serves to prevent the pin 21 from moving into engagement with the notch 9 on the underside of the bracket 7; the pin 21 riding past the notch 9 and passing from the end of the toe 64 when the plate 16 reaches its forwardmost position. When this occurs, a pin 14 on the crank 13 rides out of the notch 15 in the plate 16, so that further forward movement of the latter is prevented. Continued movement of the hand-lever 11 to its final advanced position, indicated in dotted lines in Fig. 1, causes the crank 13 and pin 14 thereon to move away from the plate 16 and at the same time causes the cam 29 to move away from the shoe 28 on the bar 27, and thereby allows the spring 30 to restore the carriage 26 to its normally advanced position. The carriage 26 in moving to its forward position carries the selector bars 32 therewith by reason of a flange 31 on the carriage 26 engaging the flanges 33 on the forward ends of the selector bars 32. The selector bars 32 in moving forward with the carriage 26 carry the bars 44 therewith into the position shown in dotted lines in Fig. 25. The forward movement of the bars 44 takes place after the pin 21 on the dog 19 passes from the toe 64 on the tumbler 60, so that the heel 63 will clear the notches 65 and permit of the advanced movement of the bars 44. The returning of the hand-lever 11 to its initial position after the operation just described, the movements of the several parts controlled thereby will be reversed, so as to restore the parts to the normal position shown in Figs. 1 to 5, inclusive.

The operation of the lock when the key 40 is inserted in the key-slot 39 is substantially the same as that just described with a few exceptions which will now be explained. When the key 40 is inserted in the key-slot 39, over the plate 37, the end of the key depresses the stop-pin G, and when the key is disposed in its innermost position the projections 41 thereon will extend upward in the path of travel of the selector bars 32 when the latter are moved rearward with the carriage 26. The selector bars 32 in moving rearward with the carriage are carried against the projections or stops 41 on the key 40, as shown in Figs. 21–26 and 27, and are held against further rearward movement; the stops 41 being staggered and so arranged as to dispose the bars 32 out of alinement with each other. The carriage 26 will continue to travel to its rearmost position after the selector bars 32 abut against the stops 41. The selector bars 32, being thus held stationary in relation to the carriage 26, causes the springs 35 to be compressed under tension by reason of the flange 31 on the carriage 26 advancing on the pins 34 in relation to the flanges 33′ on the stationary selector bars 32. The selector bars 32 will be positioned by the stops 41 on the key 40 so that the notches 36′ between a transverse row of the teeth on the selector bars will be disposed immediately under the fingers 45 of the locking bars 44, as shown in Figs. 26 and 28; the pin G not now operating to restrict the movement of its selector bar. The cam 55 will not assume a position that will allow the spring 47 to rock the housing 43 and move the outer ends of the bars 44 in a downward direction. The spring 47 exerts a sufficient pull upon the outer ends of the locking bars 44 to cause the fingers 45 on the latter to enter the notches 36′, as shown in Figs. 27 and 29. The channel formed by the notches 65 on the upper face of the locking bars 44 will be now disposed immediately under the heel 63 on the tumbler 60. The pin 21 on the dog 19 will now come into engagement with the toe 64 on the tumbler 60 and will operate to rock the latter on its pivot 59 and thereby move the heel 63 downward into the notches 65, as shown in Figs. 27 and 29. This action causes the pin 61 on the tumbler 60 to move upward out of engagement with the notch 8 on the bracket 7, carried by the bolt 2, and will allow the pin 21 on the dog 19 to enter the notch 9 on the underside of the bracket 7 in such manner that when the plate 16 is advanced to its forwardmost position by the action of the crank 13, the bolt 2 will be carried therewith to its forwardmost position, as indicated in dotted lines in Fig. 1 and in full lines in Figs. 12 and 13. When the bolt 2 reaches its forwardmost position, the notch 8′ on the bracket 9 will be disposed beneath the pin 61 on the tumbler 60; whereupon the spring 62 will act to rock the tumbler 60 and restore it to its normal position with the pin 61 extending into the notch 8′ to lock the bolt against retraction; the tumbler 60 in moving to its normal position withdrawing the heel 63 from the notches 65 so that the carriage 26 may be restored to its normal advanced position. The carriage 26 in moving forward will carry the selector bars 32 therewith; the selector bars 32 being in engagement with the bars 44 causing the latter to advance, as before described, with the exception that the bars 44 will now be positioned in staggered relation to each other, as shown in Fig. 13, so that the notches 65 thereon will be out of alinement. This positioning of the bars 44 is occasioned by reason of the selector bars 32 being thrown out of transverse alinement with each other by the staggered positions of the stops 41 on the key 40, so that the fingers 45 on the bars 44 are engaged by different relative teeth of the selector bars. This results in the several locking bars 45 being advanced different lengths of travel on the restoring of the selector bars 32 to normal; the restoration of the selector bars 32 being effected by the action of the springs 35. When the parts are thus positioned, the key 40 may be withdrawn from the lock. The bolt 2 in moving to its advanced position, carrying the plate 3 therewith, causes the beveled rear edge 5 of the latter to ride from under the beveled end 51 of the lever 50 so that the spring 52 will operate to rock the outer end of the arm 50 against the inner face of the face plate A, as shown in Fig. 12, and thereby dispose the projection 54 on the arm 50 out of the path of travel of the cam 55. This permits of the operation of the hand-lever 11 when the bolt 2 is in its advanced position, which on being moved back to its normal position when the key 40 is withdrawn from the lock will act only to reciprocate the carriage 26 and the plate 16; these actions having no effect on the lock bolt by reason of the notches 65 being disposed out of alinement and thereby prevent rocking movement of the tumbler 60, so that the pin 21 will ride over the toe 64 and will be prevented from entering the notch 9 on the bracket 7. When the parts are thus positioned, the hand-lever 11 may be freely operated in either direction.

When it is desired to unlock the lock, it is necessary to insert a key 40 in the lock corresponding to the key employed in operating the lock; that is to say, with the projections 41 thereon disposed in the identical positions of the projections of the key employed in locking the lock. Should a key having a different arrangement of projections 41 be inserted in the lock, the rearward movement of the carriage 26 on the reversed movement of the hand-lever 11 will cause the selector bars 32 to engage the projections on the key and thereby cause the bars 44 to be variously disposed according to the positions assumed by the selector bars 32. This invariably results in one or more of the notches 65 being disposed out of alinement with the heel 63 on the tumbler 60, preventing the rocking of the latter and the consequent operation of the lock. When the proper key is inserted, however, the selector bars 32 will be caused to assume such positions in relation to each other when the carriage 26 is in its rearmost position as to dispose the notches 65 on the locking bars 44 in alinement with each other and immediately under the heel 63 on the tumbler 60; the bars 44 being advanced by the action of the spring 47 when the inclined face 46 on the fingers 45 engage the selector bar teeth 36, as before described. When the parts are thus arranged, the pin 21 will operate on the toe 64 to rock the tumbler 60 and move the pin 61 thereon out of engagement with the notch 8' on the bracket 7, and thereby release the bolt 2. The pin 21 will then move into engagement with the notch 9 in such manner that when the plate 16 is moved rearwardly by the action of the pin 14 on the crank 13, the bolt 2 will be retracted therewith. The bolt 2 on its retracted movement causes the pivoted edge 5 on the plate 3 to engage the beveled plate 51 on the arm 50, thereby rocking the latter in opposition to the spring 52, and moving the projection 54 on the arm 50 into the path of travel of the cam 55 in such manner that the latter will operate to rock the bars 44 and move the fingers 45 out of engagement with the selector bars 32, so that the parts will be restored to their normal position and the key 40 withdrawn. When the notches 65 are so positioned as to allow the tumbler 60 to rock and thereby permit the spring 22 to move the pin 21 into engagement with the notch 9 on the bracket 7, the stationary cam 24 will operate on the pin 23 to throw the pin 21 out of engagement with the dog 19, so that the pin 21 will be disposed normally out of engagement with the notch 9 when the plate 16 and the bolt 2 are in either their advanced or retracted positions.

The permutation of the lock is governed by the number of selector bars employed and the number of grooves or teeth formed thereon, as the possible number of various positions of the selector bars 32 in relation to each other and to the bars 44 is controlled thereby. The keys 40 are formed with any number of stops 41 thereon, ranging from one to the number corresponding to the number of bars employed, and arranged in various positions in rows which may be two less in number than the teeth on the selector bars; the stops 41 being disposed on different keys in various positions according to the combination or position of the selector bars it is desired to obtain.

If it is desired to advance and retract the bolt on each operation of the hand-lever when a key is not in the lock and the lock is in its unlocked position, the stop pin G may be dispensed with.

Having thus described my invention, what I claim and desire to secure by Letters Patent is:

1. In a lock, a pivoted tumbler, a dead bolt normally engaged thereby, a series of permutation selector-bars, means controlled by the selector bars controlling the operation of the tumbler, by which any one of a number of keys will be effective in locking the lock and only a corresponding key effective in unlocking the lock, and manually operable means coöperating with a key for actuating the selector-bars operating the tumbler and shifting the bolt.

2. In a lock, a manually operable rock-shaft, a carriage, means for reciprocating the carriage from the rock-shaft, a dead-bolt, a tumbler normally engaging the bolt when the bolt is in an advanced or retracted position, means for normally preventing movement of the tumbler, and means on the carriage adapted to be positioned by a key on the reciprocation of the carriage for permitting the operation of the tumbler to release the bolt.

3. In a lock, a manually operable rock-shaft, a carriage, means for reciprocating the carriage from the rock-shaft, a dead-bolt, a tumbler normally engaging the bolt when the bolt is in an advanced or retracted position, means for normally preventing movement of the tumbler, means on the carriage adapted to be positioned by a key on the reciprocation of the carriage for permitting the operation of the tumbler to release the bolt, and means for actuating the tumbler when the latter is released by the rock-shaft.

4. In a lock, a manually operable rock-shaft, a carriage, means for reciprocating the carriage from the rock-shaft, a dead-bolt, a tumbler normally engaging the bolt when the bolt is in an advanced or retracted position, means for normally preventing movement of the tumbler, means on the carriage adapted to be positioned by a key on the reciprocation of the carriage for permitting the operation of the tumbler to release the bolt, means for actuating the tumbler when the latter is released by the rock-shaft, and means controlled by the rock-shaft for shifting the bolt when the tumbler is released therefrom.

5. In a lock, a dead-bolt, manually operable means for shifting the bolt, a pivoted tumbler for normally holding the bolt against movement, and means coöperating with any one of a variety of keys for permitting the operation of the tumbler and the advancement of the bolt and operable only by the insertion of the key in the lock employed in the advancing of the bolt to permit the retraction thereof.

6. In a lock, a series of independently movable selector-bars, manually operable means for shifting said selector-bars, key means for limiting the movement of any one or more of the selector-bars, a dead-bolt, and manually controlled means independent of the key operable only on the positioning of the selector-bars for advancing and retracting the bolt.

7. In a lock, a series of independently movable selector-bars, manually operable means for shifting said selector-bars, key means for limiting the movement of any one or more of the selector-bars, a dead-bolt, manually controlled means independent of the key operable only on the positioning of the selector-bars for advancing and retracting the bolt, said means operating to advance the bolt on the positioning of the selector-bars by any one of a variety of keys, and operating to retract the bolt only on the repositioning of the selector-bars by the same key previously employed in advancing the bolt.

8. In a lock, a dead-bolt, a tumbler for locking the bolt in either its advanced or retracted position, key-controlled means for controlling the operation of the tumbler, manually operated means adapted to actuate the tumbler and advance or retract the lock bolt independent of the key, and a selective mechanism operable by said manually operated means coöperating with a key to permit the operation of the tumbler and lock bolt on the insertion of any one of a number of different keys in the lock, and adapted to prevent the unlocking of the lock only on the insertion of the key employed in locking the lock.

9. In a lock, a pivoted tumbler, a bolt normally engaged by said tumbler and adapted to be released by the rocking of the tumbler, manually operated means for rocking the tumbler to release the bolt, means coöperating with the tumbler releasing means for shifting the bolt, and a key-controlled selective mechanism adapted to prevent rocking of the tumbler when the lock has been locked and adapted to permit the release of the tumbler only when the proper key is inserted in the lock.

10. A lock comprising a series of permutation selector-bars, a pivoted tumbler, a dead-bolt normally engaged by the tumbler, means controlled by the positioning of the selector-bars for permitting or preventing movement of the tumbler, coöperating means for shifting the selector-bars, tumbler and bolt, and key means for positioning the selector-bars.

11. In a changeable key lock, the combination of a dead-bolt, a single pivoted tumbler normally engaged with the bolt, a hand lever, means by which the operation of the hand lever will actuate the tumbler and shift the bolt, and a key controlled mechanism operable by any one of a variety of keys adapted to prevent the retraction of the bolt only on the insertion in the lock of a key corresponding with the key employed in locking the lock.

12. In a lock, a series of reciprocal toothed selector-bars, a series of rockable and longitudinally locking bars engageable with the selector-bars, means for throwing said bars in and out of engagement with the selector-bars, a pivoted tumbler, a bolt normally engaged thereby, and means by which the engagement of the locking bars with the selector-bars will release the tumbler from the bolt.

13. In a lock, a series of reciprocal toothed selector-bars, a series of rockable and longitudinally locking bars engageable with the selector-bars, means for throwing said bars in and out of engagement with the selector-bars, a pivoted tumbler, a bolt normally engaged thereby, means by which the engagement of the locking bars with the selector-bars will release the tumbler from the bolt, and means for reciprocating the bolt when the tumbler is released therefrom.

14. In a lock, a series of reciprocal toothed selector-bars, a series of rockable and longitudinally locking bars engageable with the selector-bars, means for throwing said bars in and out of engagement with the selector-bars, a pivoted tumbler, a bolt normally engaged thereby, means by which the engagement of the locking bars with the selector-bars will release the tumbler from the bolt, and adapted to prevent the operation of the bolt when the locking bars are not in engagement with the selector bars.

15. In a lock, a series of reciprocal toothed selector-bars, a series of rockable and longitudinally locking bars engageable with the selector-bars, means for throwing said bars in and out of engagement with the selector-bars, a pivoted tumbler, a bolt normally engaged thereby, means by which the engagement of the locking bars with the selector-bars will release the tumbler from the bolt, adapted to prevent the operation of the bolt when the locking bars are not in engagement with the selector bars, means for rocking the tumbler when the latter is released, and means coöperating with the rocking of the tumbler for shifting the bolt.

16. In a lock, a carriage, a toothed selector-bar reciprocally mounted thereon, a pivoted bar mounted to be moved longitudinally engageable with the selector-bar, means for shifting the carriage, means coöperating with the carriage shifting means for moving the pivoted bar into engagement with the selector bar, a tumbler, and means for preventing the operation of the tumbler when the pivoted bar is out of engagement with the selector-bar and adapted to permit the operation of the tumbler when the pivoted bar is engaged by the selector-bar.

17. In a lock, a carriage, a toothed selector-bar reciprocally mounted thereon, a pivoted bar mounted to be moved longitudinally engageable with the selector-bar, means for shifting the carriage, means coöperating with the carriage shifting means for moving the pivoted bar into engagement with the selector bar, a tumbler, means for preventing the operation of the tumbler when the pivoted bar is out of engagement with the selector-bar and adapted to permit the operation of the tumbler when the pivoted bar is engaged by the selector-bar, a bolt normally held against movement by the tumbler, and means for shifting the bolt when the tumbler is released therefrom.

18. In a lock, a carriage, a toothed sesector-bar reciprocally mounted thereon, a pivoted bar mounted to be moved longitudinally engageable with the selector-bar, means for shifting the carriage, means coöperating with the carriage shifting means for moving the pivoted bar into engagement with the selector-bar, a tumbler, means for preventing the operation of the tumbler when the pivoted bar is out of engagement with the selector-bar and adapted to permit the operation of the tumbler when the pivoted bar is engaged by the selector-bar, a bolt normally held against movement by the tumbler, means for shifting the bolt when the tumbler is released therefrom, and key means for limiting the movement of the selector-bar in one direction to alter the point of engagement of the pivoted bar.

19. In a lock, a carriage, a toothed selector-bar reciprocally mounted thereon, a pivoted bar mounted to be moved longitudinally engageable with the selector-bar, means for shifting the carriage, means coöperating with the carriage shifting means for moving the pivoted bar into engagement with the selector-bar, a tumbler, means for preventing the operation of the tumbler when the pivoted bar is out of engagement with the selector-bar and adapted to permit the operation of the tumbler when the pivoted bar is engaged by the selector bar, a bolt normally held against movement by the tumbler, means for shifting the bolt when the tumbler is released therefrom, key means for limiting the movement of the selector-bar in one direction to alter the point of engagement of the pivoted bar, and separate means for limiting the movement of the selector-bar adapted to prevent the pivoted bar being engaged therewith and arranged to be operated by a key to permit the engagement of the bars.

20. A lock comprising a bolt, a pivoted tumbler, a tumbler locking bar, a toothed spring pressed selector-bar, a carriage on which the selector-bar is mounted, a rockshaft, a cam on the rock-shaft for reciprocating the carriage, means controlled by the rock-shaft for rocking the locking bar, means for rocking the tumbler by the rock-shaft, and means controlled thereby for reciprocating the bolt when the locking bar is engaged by the selector bar.

21. A lock comprising a bolt, a tumbler, a tumbler locking bar, a selector-bar, a carriage on which the selector-bar is mounted, a rock-shaft, a cam on the rock-shaft for reciprocating the carriage, means controlled by the rock-shaft for rocking the locking bar, means for operating the tumbler by the rock-shaft, means controlled thereby for reciprocating the bolt, and means for governing the operation of the lock by any one of a variety of keys adapted to permit the unlocking of the lock only by the use of a key corresponding to the one employed in locking the lock.

In testimony whereof I have hereunto set my hand in the presence of two subscribing witnesses.

WALDON S. BALL.

Witnesses:
 JOHN H. HERRING,
 W. W. HEALEY.

Copies of this patent may be obtained for five cents each, by addressing the "Commissioner of Patents, Washington, D. C."